Dec. 30, 1941.   G. D. ROGERS   2,267,751
WEIGH TANK FOR EXPLOSIVES
Filed Nov. 23, 1940   2 Sheets-Sheet 1

INVENTOR
George D. Rogers
BY *GJKessenich & JH Church*
ATTORNEYS

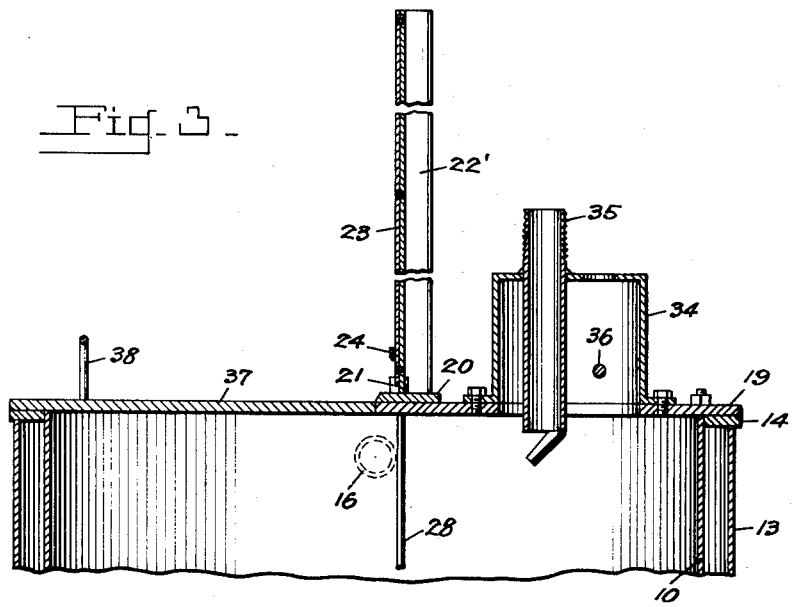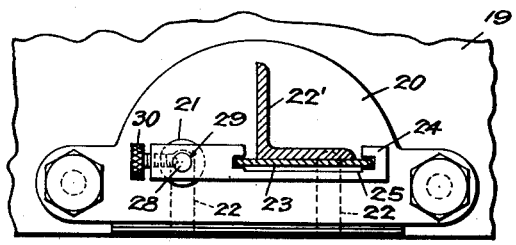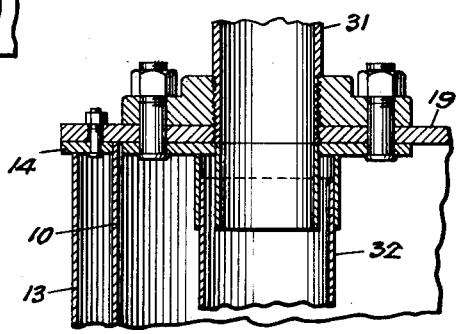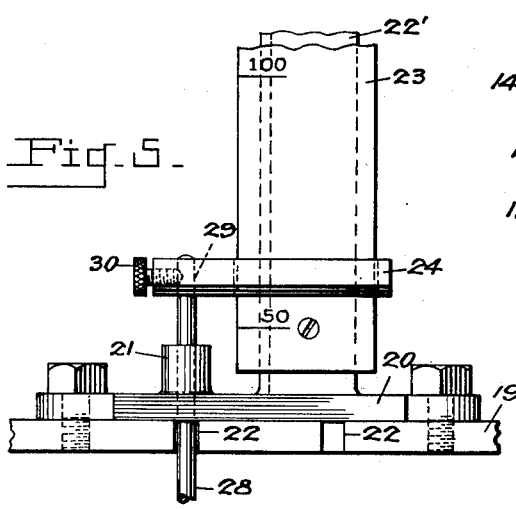

Patented Dec. 30, 1941

2,267,751

UNITED STATES PATENT OFFICE 2,267,751

WEIGH TANK FOR EXPLOSIVES

George D. Rogers, U. S. Army, Dover, N. J.

Application November 23, 1940, Serial No. 366,927

1 Claim. (Cl. 73—322)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a volumetric weigh tank for explosives and the like, and is especially adapted for use in weighing batches of molten explosives for admixture with weighed batches of explosives of a different characteristic or other ingredients.

The specific nature of the invention as well as other objects and advantages will clearly appear from a description of a preferred embodiment as shown in the accompanying drawings in which:

Fig. 3 is a fragmentary sectional view taken on the line 3—3 of Fig. 1;

Fig. 4 is a plan view partially in section showing details of the gauge;

Fig. 5 is a fragmentary elevational view of the structure shown in Fig. 4;

Fig. 6 is a partial sectional view through the duct for filling the weigh tank.

Figure 1:
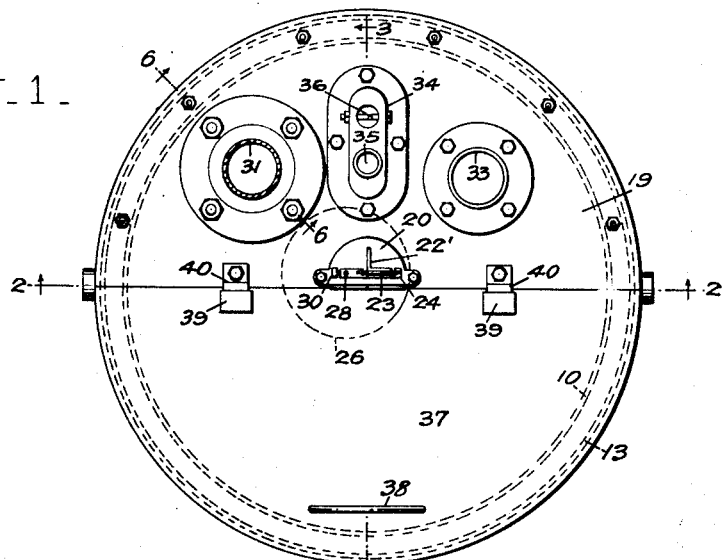
Fig. 1 is a top plan view of the tank of this invention.
Figure 2:
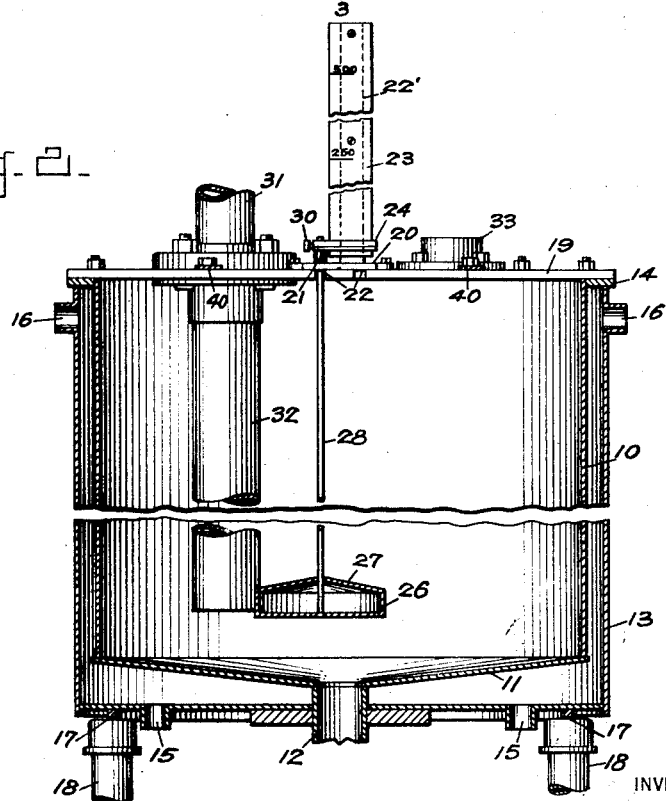
Fig. 2 is a sectional view taken on the line 2—2 of Fig. 1.

Referring now to the drawings by characters of reference and more particularly to Fig. 2, the weigh tank of this invention comprises a measuring vessel 10 of any desirable configuration but herein illustrated as being of circular cross-section and having a downwardly and inwardly sloping bottom 11 terminating in a centrally positioned outlet 12 adapted to be controlled in any conventional manner.

A jacket 13 is secured to the measuring vessel 10 in spaced relation to the side and bottom walls of the latter in the manner shown in Fig. 2 and has its upper edge secured to the upper edge portion of the vessel by means of an annular ring shaped member 14 in fluid sealed relation. Conveniently the ring shaped member 14 may be disposed to extend a slight distance radially outwardly of the jacket 13 and have its upper surface in coplanar relation to the upper edge of the vessel 10 to provide a support for the cover as hereinafter described. Inlet and outlet openings 15 and 16 through the jacket 13 provide for circulating a suitable heat exchange fluid within the chamber formed between the adjacent walls of the vessel 10 and jacket 13 to ensure keeping the contents of vessel 10 at the proper temperature.

The structure thus far described may be supported in any appropriate manner but I have found it convenient to mount it upon an annular ring 17 supported by a plurality of standards 18 as clearly shown in Fig. 2.

A semi-circular cover plate 19 is removably secured to the member 14 in closing relation to one-half the top of the vessel 10 and has removably secured thereto along its diametral edge symmetrically of its center of curvature a gauge supporting plate 20. The plate 20 is formed with a perforated boss 21 adjacent one side and the cover plate 19 is formed with spaced notches 22, either one of which is adapted to be aligned with the perforation in boss 21 when plate 20 is secured to plate 19, depending upon the relative faces of plates 19 and 20 which are abutting each other when the plates are secured together. A standard 22' herein shown as an angle iron, is secured to plate 20 in upstanding relation and has a scale plate 23 graduated in pounds or similar units, corresponding to volumetric measures of a given material in the measuring vessel, secured thereon. An indicator 24 having a T-cut 25 therein adapted to receive the scale plate is mounted on the scale plate as shown in Fig. 4, and is provided with a fiducial edge transversely disposed relative to the scale plate for indicating a particular graduation on the latter. Within the measuring vessel 10 is disposed a float 26 of generally cylindrical section having a conically shaped upper surface 27 of sufficient degree of conicity to ensure draining therefrom of any material that may accidentally fall upon the float in order to preserve a constant buoyancy thereof. A vertically disposed float rod 28 is axially secured to the float in any suitable manner at one end portion and projected through the perforated boss 21 at its opposite end portion where it is detachably secured to the indicator 24 as by securing it within a bore 29 provided therefor in the indicator by a knurled set screw 30. In this manner the indicator may be adjusted on the float rod to cause the indicator to indicate a desired graduation on the scale plate when the float is in a given position.

A filling duct 31 is secured to the cover plate 19 and has its outlet end projecting within the interior of the vessel 10 a short distance and enclosed by an egress duct 32 of slightly larger diameter and extending downwardly to a level below the top of the float 26 in its lowermost position to prevent material entering the vessel 10 from falling upon the float.

The cover plate 19 is also provided with a fitting 33 for receiving a fume duct (not shown) for conducting fumes from the vessel 10 to the ventilating system of the installation and for purposes of safety a deluge fitting 34 is secured to the cover plate having a pipe 35 adapted to be connected with a water main. The fitting 34 in addition carries a fusible link 36 which upon the contents of vessel 10 exceeding a predetermined temperature will melt permitting a valve (not shown) controlled thereby to open communication between the pipe 35 and water main for deluging the vessel 10 with water.

A cover plate 37 of the same general shape as cover plate 19 is provided with a handle 38 and clips 39 adapted to receive projections 40 secured on plate 19 for removably covering the other half of the top of vessel 10.

In use the volume corresponding to the smallest weight of batch of explosive that it will be desired to measure will be determined and the float 26 and float rod positioned in the vessel accordingly, with the float rod attached to the indicator in such position that the latter will indicate the corresponding weight on scale plate 23. The weight of the maximum volume of the measuring vessel 10 filled with a given material will be inscribed upon the scale plate 23 at a point corresponding to the position of the float 26, float rod 28 and indicator 24 when floating upon the surface portion of said maximum volume of material and the scale plate may be subdivided between the maximum and minimum readings so inscribed thereon as desired.

Having now described a present preferred embodiment of the invention I claim:

In a volumetric weigh tank, a measuring vessel, a scale bearing member affixed to the vessel in upwardly projecting relation to the top thereof, an indicator mounted on the scale bearing member for movement relative thereto, the mounting of said indicator confining movement of the same to translatory motion parallel to the scale bearing member, a float disposed within the vessel provided with an upper conical surface, a float rod rigidly connected to the float through the apex portion of the same and projecting above the top of the vessel in proximity of the indicator, means adjustably connecting the float rod portion projecting above the top of the vessel to the indicator, and a filling duct secured to the measuring vessel provided with an egress opening disposed below the upper surface of the float in the lowermost position of the latter; said filling duct, float rod, and float being the only elements projecting interiorly of the vessel substantially below the upper surface thereof.

GEORGE D. ROGERS.